US006721871B2

(12) United States Patent
Piispanen et al.

(10) Patent No.: US 6,721,871 B2
(45) Date of Patent: Apr. 13, 2004

(54) METHOD AND APPARATUS FOR SYNCHRONIZING DATA STORES WITH RESPECT TO CHANGES IN FOLDERS

(75) Inventors: Jussi Piispanen, Tampere (FI); Mikko Sahinoja, Tampere (FI)

(73) Assignee: Nokia Corporation, Espoo (FI)

( * ) Notice: Subject to any disclaimer, the term of this patent is extended or adjusted under 35 U.S.C. 154(b) by 167 days.

(21) Appl. No.: 10/115,268

(22) Filed: Apr. 2, 2002

(65) Prior Publication Data

US 2003/0191827 A1 Oct. 9, 2003

(51) Int. Cl.⁷ .............................................. G06F 15/00
(52) U.S. Cl. ........................ 712/1; 709/202; 709/203; 709/217; 709/218; 709/219; 709/246
(58) Field of Search ................................ 709/202, 203, 709/217, 218, 219, 246; 712/1

(56) References Cited

U.S. PATENT DOCUMENTS

| | | | |
|---|---|---|---|
| 5,701,423 A | | 12/1997 | Crozier et al. |
| 6,018,762 A | | 1/2000 | Brunson et al. |
| 2002/0087556 A1 | | 7/2002 | Hansmann et al. |
| 2002/0090934 A1 | * | 7/2002 | Mitchelmore ............... 455/412 |
| 2002/0161769 A1 | | 10/2002 | Sutinen et al. |
| 2003/0078890 A1 | * | 4/2003 | Schmidt et al. ............... 705/51 |
| 2003/0081557 A1 | * | 5/2003 | Mettala et al. .............. 370/252 |
| 2003/0101329 A1 | * | 5/2003 | Lahti et al. ..................... 712/1 |

OTHER PUBLICATIONS

Wireless Application Protocol MMS Encapsulation Protocol, Version 05 Jan., 2002; published on the Internet, by the Wireless Application Protocol Forum, Ltd.

SyncML Meta–Information DTD, version 1.1, Feb. 15, 2002, published on the Internet, by Ericsson, IBM, et al.

Extensible Markup Language (XML) 1.0, W3C Recommendation, Feb. 10, 1998, published on the Internet by the World Wide Web Consortium (W3C).

SyncML Representation Protocol, version 1.1, Feb. 15, 2002, published on the Internet, by Ericsson, IBM, et al.

SyncML Device Management Protocol, version 1.1, Feb. 15, 2002, published on the Internet, by Ericsson, IBM, et al.

SyncML Sync Protocol, version 1.1, Feb. 15, 2002, published on the Internet, by Ericsson, IBM, et al.

* cited by examiner

Primary Examiner—Nabil El-Hady
(74) Attorney, Agent, or Firm—Ware, Fressola, Van der Sluys & Adolphson LLP

(57) ABSTRACT

A method using SyncML, or other similar markup language, by which two devices (11 12) synchronize how data is organized in respective data stores (11c 12c) maintained by the devices (11 12), and devices (11 12) operating according to the method as well as a corresponding computer program by which either of the devices (11 12) is operable according to the method. According to the method, the two devices (11 12) synchronize their respective data stores (11c 12c) with respect to folders for containing data units and possibly other folders by steps (31e 31j) of exchanging messages (21) that include data identification elements (28 29) that refer to the folders in order to be able to synchronize the data stores (11c 1 '2c) with respect to the folders, with the data identification elements (28 29) provided in the message external to any reference to data units.

17 Claims, 4 Drawing Sheets

METHOD AND APPARATUS FOR SYNCHRONIZING DATA STORES WITH RESPECT TO CHANGES IN FOLDERS

TECHNICAL FIELD

The present invention pertains to how the respective data stores on different devices, holding data items of one or more applications such as desktop calendars and e-mail, are synchronized. More particularly, the present invention concerns how the data structure of such data stores is synchronized.

BACKGROUND ART

Today it is possible for a businessperson to use an e-mail application and a calendar application (for keeping track of appointments) on a mobile phone or a palm (handheld) computer (or some other mobile terminal) and have an assistant use the same applications on a desktop computer to keep track of e-mail sent and received by the assistant on behalf of the businessperson, and to keep track of appointments for the businessperson. In such an arrangement, it is often the case that the data items (also called here data units) for the e-mail application and data items for the calendar are kept in a data store on the mobile phone and in another data store on the desktop. Thus, when changes are made to either of the data stores, each including data items for both the e-mail and the calendar application, the data stores need to be synchronized. In synchronizing respective data stores (i.e. synchronizing both the data items and data structure of the two data stores) used by two applications running on different equipment the contents of the two data stores are set to correspond to each other based on a protocol in which changes since a last synchronization are communicated, conflicts between changes made on both pieces of equipment are resolved (according to some policy), and changes are made to either the data items or their organization or both in one or both of the data stores.

A facility is being developed for synchronizing such data stores based on what is called SyncML (synchronization markup language), being developed under the so-called SyncML Initiative. (See SyncML Internet Website for information about SyncML, including standards and specifications for SyncML, and the SyncML Initiative, especially including the SyncML Representation Protocol and the SyncML Sync Protocol.) SyncML is an open industry standard for a common language for universal synchronization of remote data (i.e. data items stored in different equipment and so in different data stores) and personal information across multiple networks, platforms and devices. With SyncML, data items, but not yet data structure, can be synchronized on different devices connected via one or more interconnecting networks, including, for example, a Universal Mobile Telecommunications System (UMTS) Radio Access Network (UTRAN) and the Internet, where the communication may be wireless in whole or in part or may be wireline. Thus, the devices may communicate via, for example, fixed networks (including wireless networks), infrared, cable, or Bluetooth.

Besides being used to synchronize data stores, SyncML (i.e. the language) can be used for device management, and more particularly for transferring management actions between a client and a management server for the client. See SyncML Internet Website to find the specification, SyncML Device Management Protocol. SyncML Device Management Protocol allows management commands to be executed on management objects and it uses a package format similar to the SyncML Synchronization Protocol and the SyncML Representation Protocol. A management object might reflect a set of configuration parameters for a device. Actions that can be taken against this object might include reading and setting parameter keys and values. Another management object might be the run-time environment for software applications on a device. Actions that can be taken against this type of object might include installing, upgrading, or uninstalling software elements. Actions are represented by SyncML Device Management Protocol Commands, which are described in SyncML Representation Protocol, Device Management Usage. The commands and message structure used correspond identically to that of the SyncML Synchronization Protocol. (Thus, the so-called document type definition for the Management Protocol is the document type definition from SyncML Synchronization Protocol.)

Until now, the progress of mobile data synchronization has mostly been determined by restrictions. Data store synchronization has been based on a set of different, proprietary protocols, each functioning only with a very limited number of devices, systems and data types. These non-interoperable technologies have complicated the tasks of users, manufacturers, service providers, and developers. Further, a proliferation of different, proprietary data store synchronization protocols has placed barriers to the extended use of mobile devices, has restricted data access and delivery and limited the mobility of the users.

As the popularity of mobile computing and communications devices grows, users want access to updated information and applications wherever they are, and using whatever device is available, prompting a need for an open standard such as the SyncML standard.

SyncML uses the syntax of the so-called Extensible Markup Language (XML) as set out in Extensible Markup Language (XML) 1.0, a product of the World Wide Web Consortium (W3C) XML Activity As used here, the terminology data item or data unit indicates a unit of data that is organized into what are here called folders that in turn make up what is here called a directory structure, also called here a data structure. Referring to FIG. 4, a directory structure is shown including various folders, each of which can include one or more data units.

The term directory structure or data structure and the term folder are to be understood broadly. First, a folder should be understood to be any container of data units. Thus, for example, what is called a folder in various operating systems (such as Windows, available from Microsoft Corporation) is to be understood by the term folder as used here, but so is a record in a table of a relational database, since a record in such a table includes fields, which are data units. Even such a field can be considered a folder, since a field contains characters, numbers, or other elements that can be considered data units, and thus each field is a folder.

The term directory structure or data structure indicates the arrangement of folders in the data store, such as for example a tree structure of folders in a directory maintained by an operating system, in which case the data units would be files. But the term directory structure or data structure should be understood to also encompass directory structures maintained internally by applications, i.e. not maintained by an operating system, but instead maintained by an application running under an operating system. An example is the directory structure maintained by most e-mail applications, which usually always include at least two folders: a received e-mail (in-box) folder and a transmitted e-mail (sent) folder. Moreover, the terminology directory structure or data structure should also be understood to encompass internal directory structures that are shared by different applications (so that the directory structure is not internal to only one application, but to several, usually well-interfaced applications, any of which can make changes to it). Further, the terminology directory structure or data structure should also be understood to encompass both system directory structures and internal directory structures. In the case of an internal directory maintained by an e-mail application, a data unit would be an e-mail, a kind of internal file. In a directory structure of either type, a folder can include, in general, data units that belong to different applications, and an application knows whether a data unit belongs to it or to another application based either on some attribute maintained in association with the data unit or based on the application keeping a private table of all data units that belong to it, wherever they may be located. Also, since as has already been explained, a folder can indicate for example a record in a table of a database or even a field within such a record, the terminology directory structure or data structure should also be understood to encompass even a database structure (when a folder is a record) or a record structure (when a folder is a field). It is important to understand that the term folder is thus used expansively, to indicate any container of data units, and the terminology directory structure or data structure has a correspondingly expansive meaning.

A user of an application can make changes to both the data units that belong to the application (such as adding a new data unit or replacing a data unit with an updated version because the user has used the application to change the contents of the data unit, and so on) as well as to how the data items are stored (such as adding a new folder and moving some data units from an already existing folder to the new folder), i.e. to both the data units as well as to the folders (i.e. the overall directory structure). According to the prior art for SyncML, however, if a user changes folders on a device, SyncML cannot be used to synchronize the data store on the device with a corresponding data store being maintained on another device; the prior art for SyncML allows only synchronizing with respect to changes in data units.

A SyncML message is a nested structure, and one or more SyncML messages can be associated with what is called a SyncML package. The SyncML Message is an individual XML document consisting of one or more elements each of one or more element types. The document consists of a header, specified by the SyncHdr element type, and a body, specified by the SyncBody element type. The SyncML header specifies routing and versioning information about the SyncML Message. The SyncML body is a container for one or more SyncML Commands. The SyncML Commands are specified by individual element types. The SyncML Commands act as containers for other element types that describe the specifics of the SyncML command, including any data or meta-information.

SyncML defines request commands and response commands. Request commands include, for example: add (a command that allows the originator to ask that one or more data units be added to data accessible to the recipient); alert (allowing the originator to notify the recipient of a condition; copy (allowing the originator to ask that one or more data units accessible to the recipient be copied); delete (allowing the originator to ask that one or more data units accessible to the recipient be deleted or archived); get (allowing the originator to ask for one or more data units from the recipient); and search (allowing the originator to ask that the supplied query be executed against one or more data units accessible to the recipient). The only response commands are currently: status (indicating the completion status of an operation or that an error occurred while processing a previous request); and results (used to return the data results of either a Get or Search SyncML Command).

SyncML uses identifiers to identify data units or folders. The identifiers are included in what are called the Source and Target element types, and can be a combination of Uniform Resource Identifiers (URIs), Uniform Resource Names (URNs), and textual names. (To indicate an International Mobile Equipment Identifier (IMEI), SyncML uses an IMEI URN type. The IMEI URN specifies a valid, 15 digit IMEI. In addition, SyncML uses the SyncML URN type to identify SyncML specific name spaces and unique names. Other URN types may also be used in the LocURI element type.)

As already mentioned, the SyncML representation protocol (i.e. a SyncML message) is a document mark-up consisting of XML element types. The element types are defined in terms of their purpose or usage, parent elements, any restrictions on content or use and content model. The element types include so-called common use elements, message container elements, data description elements, protocol management elements, and protocol command elements.

Common use element types are element types used by other SyncML element types, and include, for example, archive, for indicating that the data specified in a delete command should be archived by the recipient of the delete command, rather than simply deleted. Thus the delete command can use the archive common use element and so is referred to as the parent element of the archive common use element type, in this context. Another common use element type is the Cmd element type, which is used to specify the SyncML command referenced by a Status element type (and so the Status element type is the parent element in this context). Another is the CmdID element type, which is used to specify a SyncML message-unique command identifier, and can have various parent elements, including: Add, Alert, Atomic, Copy, Delete, Exec, Get, Map, Put, Replace, Results, Search, Sequence, Status, and Sync.

Of particular note in respect to the invention are the common element types LocName, LocURI, Source, and Target. LocName is used to specify the display name for the target or source address, and so can have as parent elements Target or Source. LocURI specifies the target or source specific address, and can also have as parent elements Target or Source. The common element type Source is used to specify source routing or mapping information; its parent elements include: Item, Map, MapItem, Search, Sync, and SyncHdr. Target is used to specify target routing or mapping information, and its Parent Elements include: Item, Map, MapItem, Search, Sync, and SyncHd.

Message container element types provide basic container support for SyncML messages. Three such element types are: SyncML, for specifying the container for a SyncML message, and having no parents since it is what is called a root or document element; SyncHdr, for specifying the container for the revisioning information or the routing information (or both) in the SyncML message, and having as a parent element a SyncML element; and SyncBody, for specifying the container for the body or contents of a SyncML message, and also having as a parent element a SyncML element.

Data description elements are used as container elements for data exchanged in a SyncML Message; data description elements include the following element types: Data, for specifying discrete SyncML data, and used by (parent elements) Alert, Cred, Item, Status, and Search element types; Item, for specifying a container for item data, and used by (parent elements) Add, Alert, Copy, Delete, Exec, Get, Put, Replace, Results, and Status; and Meta, for specifying meta-information about the parent element type, and used by (parent elements) Add, Atomic, Chal, Copy, Cred, Delete, Get, Item, Map, Put, Replace, Results, Search, Sequence, and Sync.

The protocol management elements include, at present, only the element type Status, for specifying the request status code for an indicated SyncML command, and used by (parent element) SyncBody.

Finally, there are the Protocol Command Elements. These include the command elements already mentioned, i.e. for example: Add, for specifying that data be added to a data collection, used by (parent elements) Atomic, Sequence, Sync, SyncBody; Delete; Replace; and so on.

All of the above element types are set out in the standard, SyncML Representation Protocol, available on the Internet at SyncML Website Communicating changes in a directory structure is not problematic if the same application takes care of handling the data and handling the communication according to a synchronization protocol. But in case of the more general problem, in which on each device several applications share a data store organized as a directory structure, storing their respective data units in one or more of the folders of the directory structure, how best to arrange for synchronizing not only data units but also folders, i.e. how to structure a synchronization protocol for doing so, is not clear. According to the open standard, SyncML Synchronization Protocol, a product of the SyncML Initiative, each of two remote devices having respective data stores to be synchronized (in any respect), includes a synchronization (sync) agent (one per device, and so serving possibly many different applications) and one or more application entities, and following synchronization protocol (i.e. communicating according to the synchronization protocol set out in the standard) is the responsibility not of the applications, but of the sync agents. (Only the sync agent understands SyncML, not the applications.) But only the applications know whether a data unit has been changed since the most recent, already-performed synchronization. There are some options for how to extend the SyncML synchronization protocol that require including in each of the applications a knowledge of SyncML, like what is encoded in the sync agent, and some options that require the sync agent to be able to interpret data units the way the different applications do.

What is needed is a way for SyncML (or any analogous synchronization language) to refer to aspects of data organization, such as folders in a directory structure, in a way that minimizes the demands on the sync agent and application, and so avoids having to replicate code or folder information.

DISCLOSURE OF THE INVENTION

Accordingly, in a first aspect of the invention, a method is provided, for use by a first sync agent operative in association with a first data store and by a second sync (synchronization) agent operative in association with a second data store, by which the first data store is synchronized with the second data store, the data stores each being used for storing data as data units in folders by a first and second respective application distinct from the first and second sync agents, the folders in combination defining a data structure, the method comprising: a step in which the first and second sync agents establish a transport connection for enabling communication between the first and second sync agents; and a step in which the second sync agent communicates via the transport connection a message to the first sync agent, the message being expressed using a markup language and having at least one data identification element (the term data identification element being used here to indicate either what in SyncML is called a Target element or what in SyncML is called a Source element, but is to be understood to also encompass similar elements in any markup language similar to SyncML, so that the term data identification element stands in contradistinction to the term data element, which refers to an element in the SyncML or similar language that contains a data unit); wherein information about a change in the data structure of the first or second data store is transmitted in said message; and further wherein said information about a change in the data structure of the first or second data store is placed in the at least one data identification element.

In accord with the first aspect of the invention, the at least one data identification element may be external to, i.e. not contained in, a data element (i.e. a particular type of data description element of the SyncML markup language or a similar element of a similar markup language). Also in accord with the first aspect of the invention, the information about a change in the data structure of the first or second data store may include an identification of a folder. Also, the at least one data identification element may be either a target element or a source element. Still also, the data identification element may be contained in a protocol command element and the protocol command element in combination with the data identification element may indicate the information about a change in the data structure of the first or second data store. Still also, the data identification element may contain a so-called (in the markup language SyncML) LocURI element (or a similar element in a similar markup language) assigned by the second sync agent and the information about a change in the data structure of the first or second data store may be provided in the LocURI element.

Even still in accord with the first aspect of the invention, a first device may host the first sync agent as well as the first data store and the first application and a second device may host the second sync agent and also the second data store and the second application. Further, the first device may function as a client in a client/server protocol and the second device may function as a server in the client/server protocol, and the message may be provided by the client to the server. Also further, the first device may function as a server in a client/server protocol and the second device as a client in the client/server protocol, and the message may be provided by the server to the client, and the step of communicating the message may be responsive to a client message and may (also) include resolving any conflicts posed by the client message in respect to the data store hosted by the server.

Yet even still in accord with the first aspect of the invention, the first application may be responsive to any data element included in the message and the first sync agent may be responsive to the data identification element and may make changes to the data structure of the first data store based on the information conveyed by the data identification element before the first application makes any changes to the data units of the data store based on information conveyed by any data elements included in the message. Also, the second sync agent may provide in the data identification element the information about a change in the data structure of the first or second data store and the second application may provide in a data element information about a change in data units in the first or second data store. Still also, the first sync agent, in response to the message, may extract the information about a change in the data structure from the data identification element and may provide the information to either a sync engine or to an application entity.

In a second aspect of the invention, a device is provided operative according to the first aspect of the invention in respect to the operation of the first device and also in respect to the operation of the second device. In accord with the second aspect of the invention, the device may be a wireless communication terminal. Also, the device may instead be a wireline communication terminal. Still also, the device may function as a server in a client server model and may include a sync engine for resolving conflicts posed by the message.

In a third aspect of the invention, a system is provided comprising a first device as in the second aspect of the invention, wherein the first device functions as a server in a client server model and includes a sync engine for resolving conflicts posed by the message, and also comprising a second device in the second aspect of the invention, wherein the second device functions as a client in the client server model.

In a fourth aspect of the invention, a computer program is provided for indicating operating instructions for a telecommunications device (11 12) so that the telecommunications device (11 12) is operative according to the first aspect of the invention in respect to the first device and also in respect to the second device.

In a fifth aspect of the invention, a computer program is provided for indicating operating instructions to a sync agent so that the sync agent is operative according to the first aspect of the invention in respect to the first sync agent and also in respect to the second sync agent.

Thus, the invention extends SyncML so as to provide a way to synchronize data stores for changes in folders, data stores that can be used by applications in connection either with user data or with device management; now both changes in folders and changes in data units in one data store can be reflected in another data store.

The invention has the advantage of not requiring that each application on a device be encoded so as to understand SyncML, but only to interface with the sync agent for the device and, on a server, the sync engine. In addition, the invention avoids having to include in the sync agent on each device any knowledge of how to interpret data units for the different applications sharing the data store being synchronized with a corresponding data store on another device.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
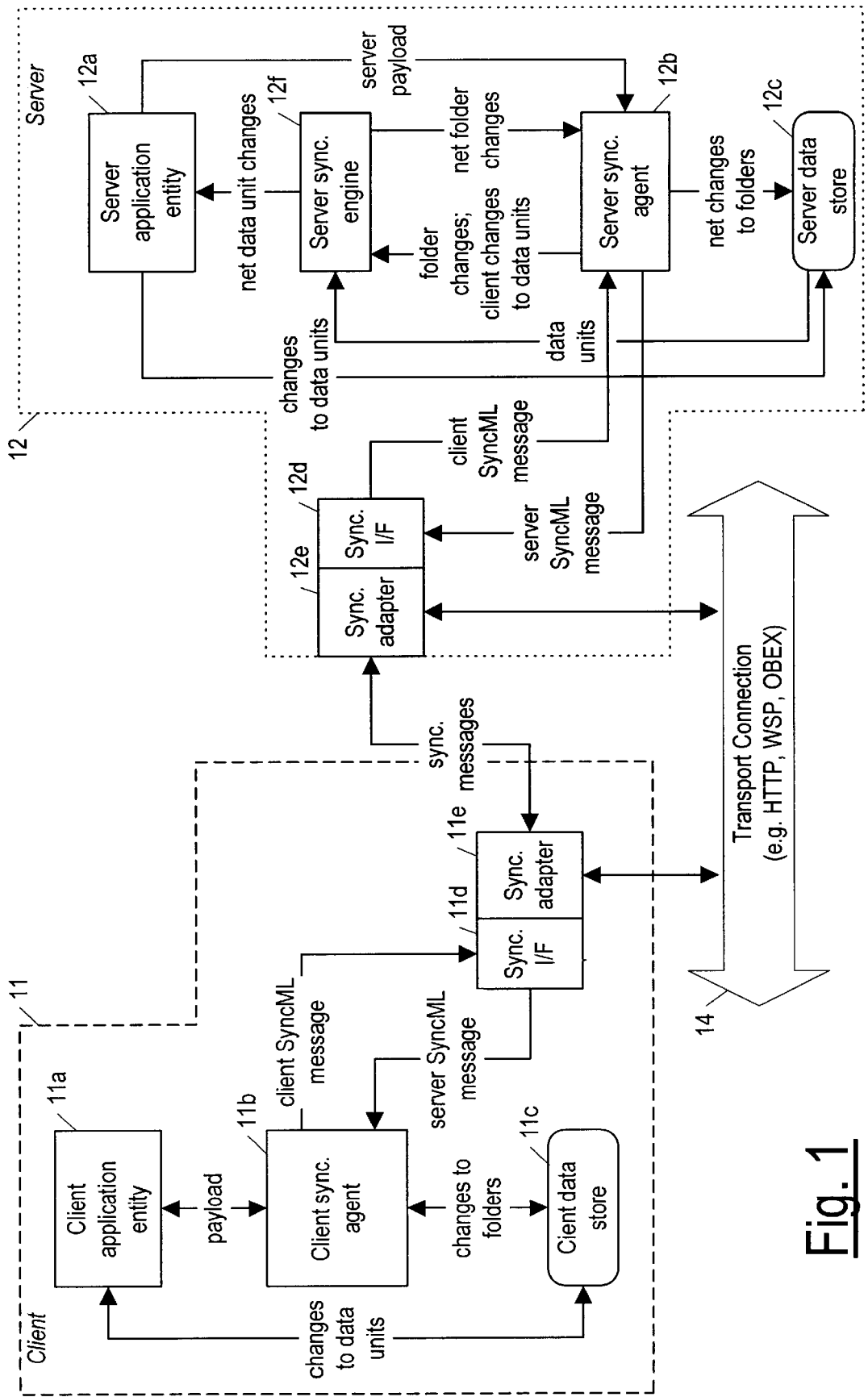
FIG. 1 is a block diagram/flow diagram of a client (such as a mobile phone) and a server (such as a network server or is PC) exchanging SyncML messages to synchronize their respective data stores, according to the invention.
Figure 4:
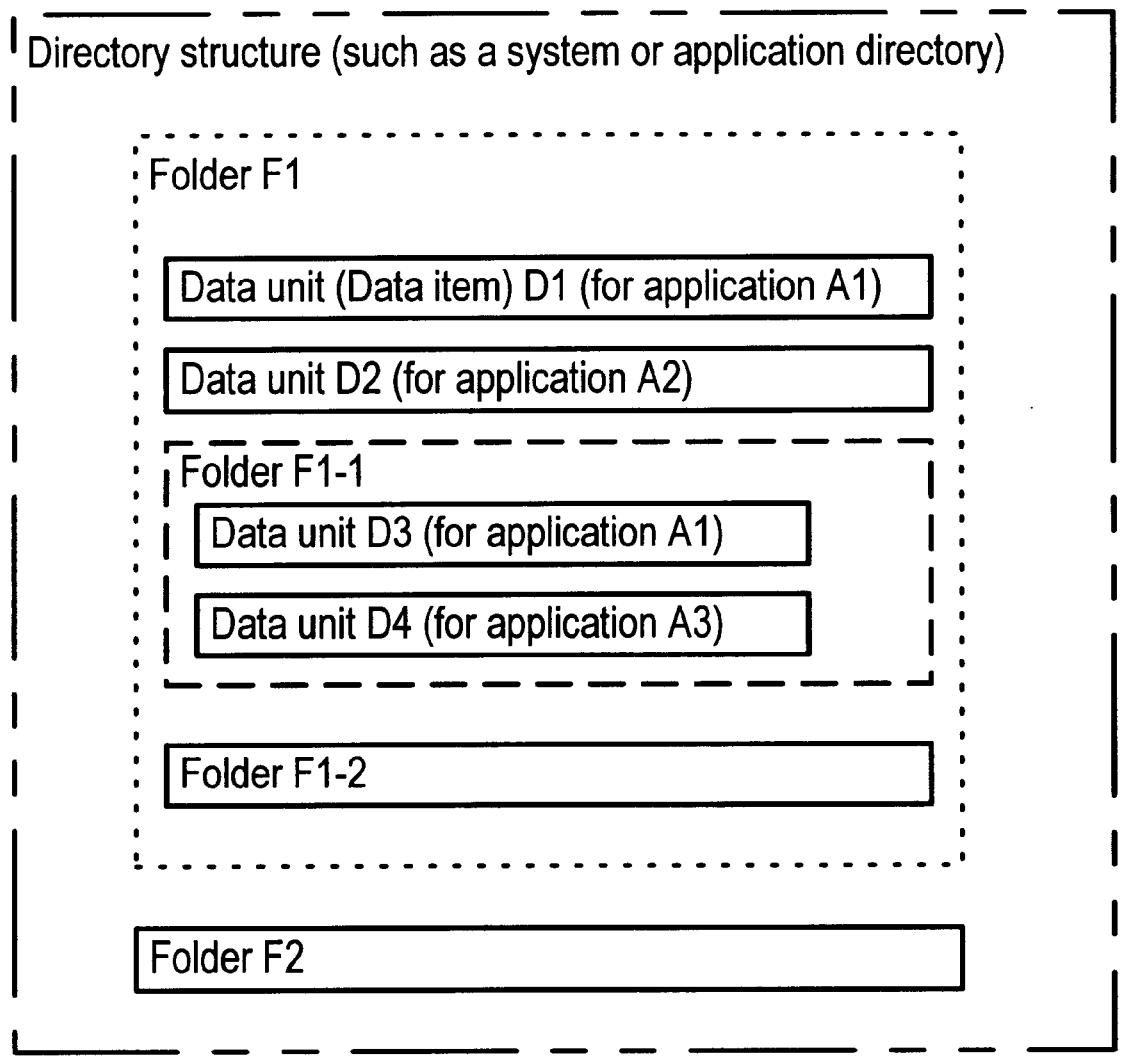
FIG. 4 is a schematic of a directory structure (according to the prior art).

Referring now to FIG. 1, a client 11 is shown synchronizing a client data store 11c with a corresponding server data store 12c of a server 12. (The data stores can be of use in either device management or for holding user data, such as for example e-mails.) A data store can in general include one (or even more) system directory structures and possibly also one or more internal directory structures (i.e. an internal directory structure being one maintained by one or more applications as opposed to an operating system), with any directory structure able to be represented as illustrated in FIG. 4, so that a directory structure is a tree structure of folders, each folder able to include one or more data units (such as files, i.e. units of data maintained in a system directory structure, or units or data maintained by applications in an internal directory, such as e-mails maintained by an e-mail application) and one or more other folders of the tree structure. The synchronizing occurs via the exchange of SyncML messages, although messages according to any similarly structured or analogous language could also be used. Some of the SyncML messages being exchanged include commands for synchronizing the data stores 11c 12c with respect to data units, and some for synchronizing the data stores with respect to the data organization, i.e. so that both data stores have an equivalent structure in terms of folders, at least in so far as the applications are concerned on whose behalf the synchronization is being performed. The client 11 is any device that plays the role of a client in a client/server model, and according to SyncML protocol, a client (usually a laptop or a portable phone or other wireless terminal) sends all changes in its data store 11c to the server 12, a device (usually for example a desktop computer) having the role of a server in the client/server model. (Of two devices synchronizing their respective data stores, the device having the greater computing capability will usually assume the role of the server.)

The client 11 and the server 12 include one or more respective application entities 11a 12a, and they also include a (generic, i.e. not particularized to a particular application) respective sync agents 11b 12b. The server application entity 12a differs from the client application entity 11a in that it not only interfaces with the server sync agent, but also interfaces with a server sync engine 12f, which has no counterpart in the client 11. Similarly, the server sync agent 12c differs from the client sync agent 11c in that it also interfaces with the server sync engine 12f. The client/server application entity 11a/12a is for example a calendar application used to keep track of appointments for a salesperson. If an appointment is made on the client device 11, then the appointment information is stored in the client data store 11c as a new file. Later, either at the request of the client 11 or the prompting of the server 12, the data store 12c is synchronized with the client data store 11c in respect to the new data (i.e. the new file). In addition, if a change is made to the directory structure on the client data store 11c, then again, the client data store 11c and server data store 12c must be synchronized, in this case with respect to the directory structure, i.e. in respect to what folders are used to hold the data units for the application. Also, any change made on the server data store 12c, including changes to either folders or data units for the applications 11a 12a, will require synchronizing the client data store 11c and the server data store 12c by the exchange of SyncML messages.

Still referring to FIG. 1, the SyncML messages may be communicated according to various transport connections 14, including for example hypertext transport protocol (HTTP), wireline session protocol (WSP), and object exchange protocol OBEX). (The transport connections may be provided using any kind of physical layer connection, including either a wireless connection or a wireline connection.) As shown, when the server 12 communicates a SyncML message to the client 11 (and vice versa), the server sync agent 12b uses a sync interface (I/F) 12d to provide the message to a server sync adapter 12e which in turn provide the SyncML message to the client 11 via the transport connection 14. At the receiving end, a client sync adapter 11e receives the SyncML message and passes it to a client sync I/F 11d which in turn provides it to the client sync agent 11b.

Now, to provide for synchronizing the data stores 11c 12c with respect to changes in folders as well as data units (so that the same data units are in the same or equivalent folders on each device, and the content of each corresponding data unit is the same), the invention has SyncML use the same commands for changing folders as are used to change data units; thus, changes to folders are made by issuing messages conveying operational elements (Protocol Command Elements), such as Sync, Add, Replace and Delete, in which the affected folders are referenced within what are here called Data Identification Elements, meaning either TARGET or SOURCE elements, external to DATA elements. To make a change to a data unit, SyncML according to the prior art calls for a message referencing the data unit within a DATA element nested in an operational element. It is the use of a reference to affected folders external to the DATA element (i.e. a data description element) that gives the invention advantages over other possible arrangements for referring to affected folders (namely, not having to duplicate code enabling SyncML parsing by each application, and not having to include in each sync agent code for interpreting the data units of each different application).

Figure 2:
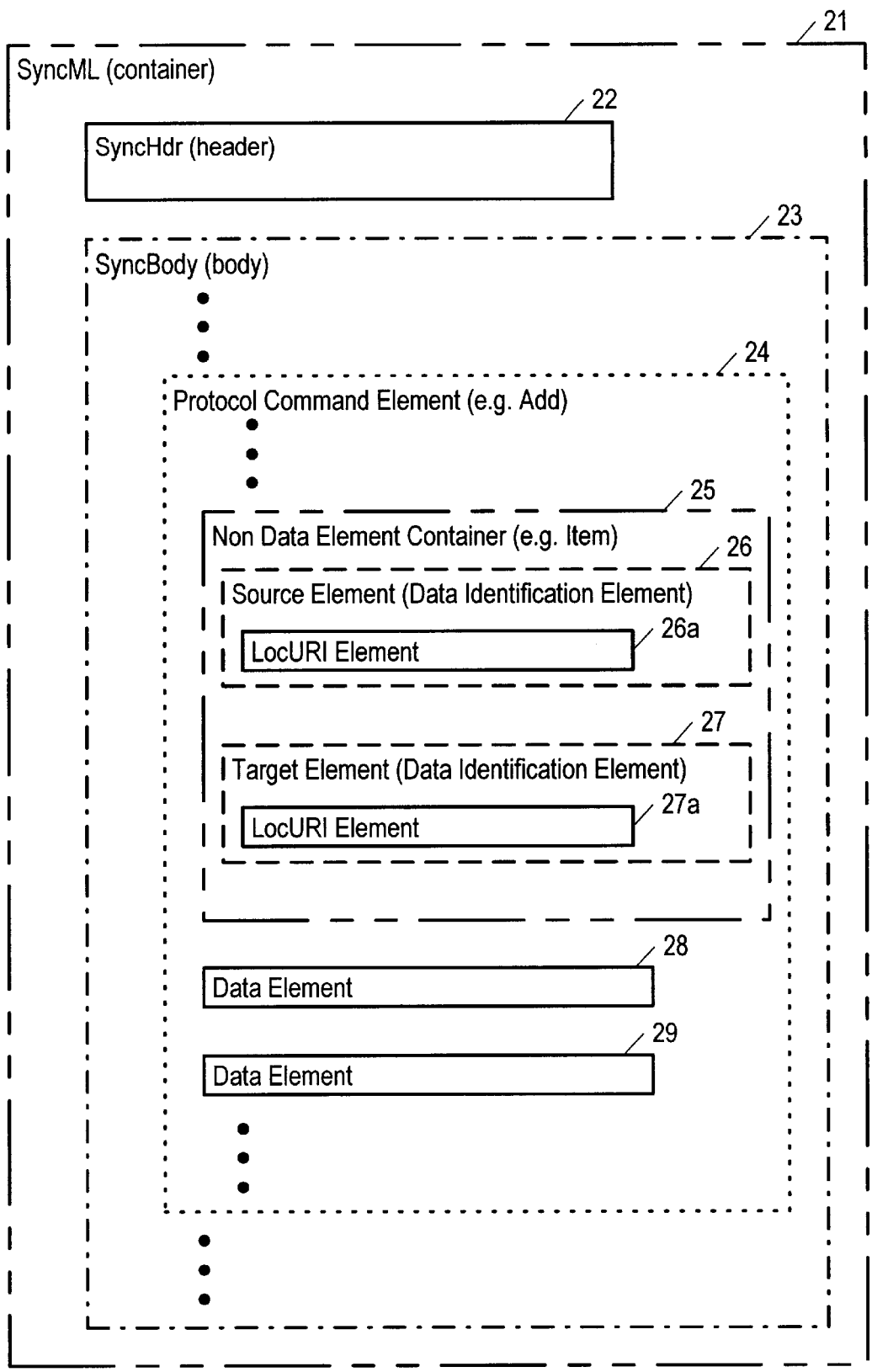
FIG. 2 is a schematic of a SyncML message according to the invention.

Referring now to FIG. 2, thus, according to the invention, folders (and thus the data organization in terms of directories) affected in the course of synchronizing the data stores 11c 12c are identified or indicated in the LocURI elements 26a 27a of the Source element 26 and the Target element 27 of a protocol command element 25 (such as replace) external to (i.e. not contained in) a data element 28 29 (i.e. a particular type of data description element). Both the Target and Source elements are here called Data Identification Elements, to stand in contradistinction to the data elements 28 29 that contain the data units. The data identification elements according to the invention are typically embedded in a non-data element container (such as an item element) which in turn is embedded in a protocol command element 24. The protocol command element 24 is conveyed as part of the SyncBody container element 23, along with a SyncHdr container element 22, both included in a SyncML container element, i.e. a SyncML message 21.

When changes have been made to both data units and folders, the folders must be synchronized first, and messages are formulated so that first the folder changes are made and then the data unit changes. Each change (to either data units or folders) is accomplished via an operational element. The changes to the folders should be arranged to come before any changes to the data units.

Thus, according to the invention, when sending a folder change in a message, e.g. when adding a new folder to a client, the data element (i.e. a particular type of data description element) of the operational element "add" is left empty or no such ("add") element is indicated in the message, and the folder information (folder's ID and the full path) is conveyed within the LocURI element of a data identification element (a Source element or a Target element) external to any data element.

The following SyncML message fragment shows how, within a replace command, to address a folder having the identifier 7 and located within a folder having the identifier 1.

```
<Replace>
    ...
    <Item>
        <Source>
            <LocURI>./1/7/</LocURI>
            <LocName>My own messages</LocName>
        <Source>
    ...
</Replace>
```

When addressing a data unit in a folder (as opposed to the folder itself), the folder's identifier and the path of the folder with respect to the root of the directory structure (in case of a tree structure) is transferred within the LocURI of the Target and Source common element types of an operational element, i.e. a protocol command element (such as Replace or Delete). The example below shows how to address an item having a locally unique identifier (LUID) of 123 in a folder having the identifier 7, when the folder 7 is located within a folder having the identifier 1.

```
<Replace>
    ...
    <Item>
        <Source>
            <LocURI>./1/7/123</LocURI>
            <LocName>Hi there!</LocName>
        </Source>
    ...
</Replace>
```

Below is an example of a SyncML message according to the invention including the operational elements (commands) used for creating folder information in the recipient end (which could be either the client or the server). In the example, clear text XML used; in a wireless environment, clear text would normally not be used, and instead WBXML (wireless binary XML) would be used.

```
<SyncML>
    <SyncHdr>
        <VerDTD>1.0</VerDTD>
        <VerProto>SyncML/1.0</VerProto>
        <SessionID>1</SessionID>
        <MsgID>2</MsgID>
        <Target><LocURI>OBEX://123456/messaging-server</LocURI></Target>
        <Source><LocURI>IMEI:493005100592800</LocURI></Source>
    </SyncHdr>
    <SyncBody>
    . . .
        <Sync>
        <CmdID>3</CmdID>
        <Target>
                <LocURI>./Messaging/MMS</LocURI>
            </Target>
            <Source>
                <LocURI>./MMS</LocURI>
            </Source>
            <Replace>
                <! --Sending the folder structure -->
                <CmdID>4</CmdID>
                <Item>
                    <Source>
                        <LocURI>./100/</LocURI>
                        <LocName>My Folder</LocName>
                    </Source>
                </Item>
            </Replace>
    . . .
</SyncML>
```

The above SyncML message fragment renames the folder having a LocURI of ./100/ so as to have a name of "My folder".

Synchronization

According to the invention, (two-way) synchronization can be done as described for example in the specification, SyncML Synchronization Protocol, version 1.1, augmented as follows.

If there are modifications in the client's folder structure after the previous sync, then the following requirements for the operational elements (e.g., Replace, Add and Delete) within the Sync element should be met.

Sending the folder information should be done before sending any message objects, i.e. the Replace commands should be specified in the modifications package before specifying the commands defining any modifications for the messaging objects.

Data element should not be specified for the Item element.

If the operation is not a deletion, the Mark element within the Meta element of the Item element should be used to carry information about the folder (e.g. the type of the folder).

If the operation is not a deletion, the LocName element within the Source of the Item element should specify the folder's displayable name.

The LocURI element within the Source of the Item element should specify the folder identifier and the entire path of the folder, i.e. all possible subfolder identifiers should also be specified in the LocURI element. The folder identifiers should be delimited by the slash character ('/').

If there are modifications in messaging objects in the client after the previous sync, then the following requirements for the operational elements within the Sync element should be met.

If the operation is not a deletion, the LocName element within the Source of the Item element should specify the displayable name of the message.

If the operation is not a deletion, the Mark element within the Meta element of the Item element should be used to carry information about the state of the message (e.g. read/unread information).

The LocURI element within the Source of the Item element should specify the item's identifier including the entire path, i.e. all possible folder and subfolder identifiers should also be specified in the LocURI element. The item identifier (i.e. the LUID) should always be presented as the last value in the LocURI element. The folder identifiers should be delimited by the slash character ('/').

What follows is an example of a client sending modifications to a server.

```
<SyncML>
    <SyncHdr>
        <VerDTD>1.0</VerDTD>
        <VerProto>SyncML/1.0</VerProto>
        <SessionID>1</SessionID>
        <MsgID>2</MsgID>
        <Target><LocURI>OBEX://123456/messaging-server</LocURI></Target>
        <Source><LocURI>IMEI:493005100592800</LocURI></Source>
    </SyncHdr>
    <SyncBody>
        <Status>
```

```
        <CmdID>1</CmdID>
        <MsgRef>1</MsgRef>
        <CmdRef>0</CmdRef>
        <Cmd>SyncHdr</Cmd>
        <TargetRef>IMEI:493005100592800</TargetRef>
        <SourceRef>OBEX:///123456/messaging-server</SourceRef>
        <Data>212</Data> <!--Statuscode for OK, authenticated for session-->
</Status>
<Status>
        <CmdID>2</CmdID>
        <MsgRef>1</MsgRef>
        <CmdRef>5</CmdRef>
        <Cmd>Alert</Cmd>
        <TargetRef>./MMS</TargetRef>
        <SourceRef>./Messaging/MMS</SourceRef>
        <Data>200</Data> <!--Statuscode for Success-->
        <Item>
            <Data>
                <Anchor xmlns='syncml:metinf'><Next>200005022T093223Z </Next></Anchor>
            </Data>
        </Item>
</Status>
<Sync>
        <CmdID>3</CmdID>
        <Target>
            <LocURI>./Messaging/MMS</LocURI>
        </Target>
        <Source>
            <LocURI>./MMS</LocURI>
        </Source>
        <Meta>
            <Mem xmlns='syncml:metinf'>
                <FreeMem>8100</FreeMem>
                <! --Free memory (bytes) in MMS database on a device -->
                <FreeId>81</FreeId>
                <!--Number of free records in MMS database-->
            </Mem>
        </Meta>
        <Replace>
            <! --Sending the folder structure -->
            <CmdID>4</CmdID>
            <Item>
                <Source>
                    <LocURI>./100/</LocURI>
                    <LocName>My Folder</LocName>
                </Source>
            </Item>
        </Replace>
        <Replace>
            <! --Sending the folder structure -->
            <CmdID>5</CmdID>
            <Item>
                <Source>
                    <LocURI>./102/</LocURI>
                    <LocName>My messages</LocName>
                </Source>
            </Item>
        </Replace>
        <Replace>
            <! --Sending the actual message -->
            <CmdID>6</CmdID>
            <Meta>
                <Type xmlns='syncml metinf'>application/wap.mms-message</Type>
            </Meta>
            <Item>
                <Source>
                    <LocURI>./100/123</LocURI>
                    <LocName>Hi there!</LocName>
                </Source>
                <Data><!--The MMS data would be placed here.--></Data>
            <Meta>
                <Mark xmlns='syncml:metint'>unread</Mark>
                <!-- Item's status is 'unread' -->
            </Meta>
            </Item>
        </Replace>
```

-continued

```
    </Sync>
    <Final/>
  </SyncBody>
</SyncML>
```

If there are modifications in the server's folder structure after the previous sync, then the following requirements for the operational elements within the Sync element should be met.

Sending the folder information should be done before sending any message objects, e.g. the Replace command should be specified in the modifications package before specifying any commands defining the modifications for the messaging objects.

Data element should not be specified for the Item element.

If the operation is not a deletion, the Mark element within the Meta element of the Item element should be used to carry information about the folder (e.g. the type of the folder).

If the operation is not a deletion, the LocName element within the Target of the Item element should specify the folder's displayable name.

If the operation is an addition, then the LocName of the Source element should specify the folder's displayable name.

The LocURI element within the Target of the Item element should specify the client side folder identifier and the entire path of the folder, i.e. all possible subfolder identifiers should also be specified in the LocURI element. The folder identifiers should be delimited by the slash character ('/').

If the operation is an addition, then the LocURI of the Source element should specify the server side folder identifier and the path. The LocURI of the Target element should specify the folder path of the client. The folder identifier should not be specified within the Target LocURI.

If there are any modifications in messaging objects in the server after the previous sync, then the following requirements for the operational elements within the Sync element should be met.

In case the operation is an addition, then the LocName element within the Source of the Item element should specify the displayable name of the message. The LocURI element within the Source of the Item element should specify the item's identifier including the entire path, i.e. all possible folder and subfolder identifiers should also be specified in the LocURI element. The item identifier (i.e. the GUID) should always be presented as the last value in the LocURI element. The folder identifiers should be delimited by the slash character ('/'). The LocURI of the Target element should specify the folder path of the client, but the item identifier should not be specified within the Target LocURI.

If the operation is a modification, then the LocName element within the Target of the Item element should specify the displayable name of the message. The LocURI element within the Target of the Item element should specify the item's identifier including the entire path, i.e. all possible folder and subfolder identifiers should also be specified in the LocURI element. The item identifier (i.e. the LUID) should always be presented as the last value in the LocURI element. The folder identifiers should be delimited by the slash character ('/').

If the operation is a deletion, the LocURI element within the Source of the Item element should specify the client side item identifier including the entire path of the client, i.e. all possible folder and subfolder identifiers should also be specified in the LocURI element. The folder identifiers should be delimited by the slash character ('/').

If the operation is not a deletion, the Mark element within the Meta element of the Item element should be used to carry information about the state of the message (e.g. read/unread information).

What follows is an example of a server sending modifications to a client.

```
<SyncML>
    SyncHdr>
        <VerDTD>1.0</VerDTD>
        <VerProto>SyncML/1.0</VerProto>
        <SessionID>1</SessionID>
        <MsgID>2</MsgID>
        <Target><LocURI>IMEI:493005100592800</LocURI></Target>
        <Source><LocURI>OBEX://123456/messaging-server</LocURI></Source>
    </SyncHdr>
    <SyncBody>
        <Status>
            <CmdID>1</CmdID>
            <MsgRef>2</MsgRef><CmdRef>0</CmdRef><Cmd>SyncHdr</Cmd>
            <TargetRef>OBEX://123456/messaging-server</TargetRef>
            <SourceRef>IMEI:493005100592800</SourceRef>
            <Data>200</Data>
        </Status>
        <Status><!--This is a status for the client modifications to the server.-->
        <CmdID>2</CmdID>
            <MsgRef>2</MsgRef><CmdRef>3</CmdRef><Cmd>sync</Cmd>
            <TargetRef>./Messaging/MMS</TargetRef>
            <SourceRef>./MMS</SourceRef>
            <Data>200</Data><!--Statuscode for Success-->
        </Status>
```

-continued

```
    <Status>
        <CmdID>3</CmdID>
        <MsgRef>2</MsgRef><CmdRef>4</CmdRef><Cmd>Replace</Cmd>
        <SourceRef>./100/</SourceRef>
        <Data>200</Data> <!--Statuscode for Success-->
    </Status>
    <Status>
        <CmdID>3</CmdID>
        <MsgRef>2</MsgRef><CmdRef>5</CmdRef><Cmd>Replace</Cmd>
        <SourceRef>./102/</SourceRef>
        <Data>200</Data> <!--Statuscode for Success-->
    </Status>
    <Status>
        <CmdID>3</CmdID>
        <MsgRef>2</MsgRef><CmdRef>6</CmdRef><Cmd>Replace</Cmd>
        <SourceRef>./100/123</SourceRef>
        <Data>200</Data> <!--Statuscode for Success-->
    </Status>
    <Sync>
        <CmdID>4</CmdID>
        <Target><LocURI>./MMS</LocURI></Target>
        <Source><LocURI>./Messaging/MMS</LocURI></Source>
        <Add>
            <!--Sending the folder structure -->
            <CmdID>5</CmdID>
            <Item>
                <Target>
                    <LocURI>./102/</LocURI>
                </Target>
                <Source>
                    <LocURI>./4044/223/</LocURI>
                    <LocName>My Own messages</LocName>
                </Source>
            </Item>
        </Add>
        <Replace>
            <CmdID>6</CmdID>
            <Meta>
                <Type xmlns='syncml:metinf'>application/wap.mms-message</Type>
            </Meta>
            <Item>
                <Target>
                    <LocURI>./102/1023</LocURI>
                    <LocName>A holiday picture.</LocName>
                </Target>
                <Data><!--The MMS data would be placed here.--></Data>
                <Meta>
                    <Mark xmlns='syncml:metinf'>send</Mark>
                </Meta>
            </Item>
        </Replace>
        <Add>
            <CmdID>7</CmdID>
            <Meta>
                <Type xmlns='syncml:metinf'>application/wap.mms-message</Type>
            </Meta>
            <Item>
                <Target>
                    <LocURI>./102/</LocURI>
                </Target>
                <Source>
                    <LocURI>./4044/1980556</LocURI>
                    <LocName>Hello John!</LocName>
                </Source>
                <Data><!--The MMS data would be placed here.--></Data>
                <Meta>
                    <Mark xmlns='syncml:metinf'>read</Mark>
                </Meta>
            </Item>
        </Add>
    </Sync>
    <Final/>
</SyncBody>
</SyncML>
```

In the command above having command identifier (ID) 5, the server uses a globally unique identifier (GUID) of ./4044/223/ for a folder having the name "My Own Messages." As set out in the SyncML Sync Protocol (Standard), version 1.1, at section 5.3, the client sync agent will assign a LUID for the folder and will then return to the server a map showing how the LUID (of the client) is related to the GUID (of the server). (See the example given at section 5.3.1.)

Some Folder Manipulations

As already explained, a folder is just another object in a synchronization session. Take as an example a case where a user has created a new folder in the client device (e.g. a laptop or a mobile phone), so that the client must send a Replace command containing the information about the new folder in the next synchronization session. This would be done with the following SyncML message fragment, according to the invention.

```
...
<Sync>
    <CmdID>4</CmdID>
    <Target><LocURI>./MMS/LocURI></Target>
    <Source><LocURI>./Messaging/MMS</LocURI></Source>
    <Replace>
        <CmdID>5</CmdID>
        <Item>
            <Source>
                <LocURI>./4/7/</LocURI>
                <LocName>My messages</LocName>
            </Source>
        </Item>
    </Replace>
    ...
</Sync>
```

When the recipient receives an operation (i.e. Replace or Add) that does not contain the Data element, it should assume that the operation is a folder manipulation operation.

Creating Folders

Creating folders is done by specifying a Replace or an Add command. The following is an example of how to create a new folder, having the folder identifier 7, in the Inbox folder of the client (with the client side Inbox folder having an identifier of 1011).

```
<Add>
    <CmdID>4</CmdID>
    <Item>
        <Target>
            <LocURI>./1011/</LocURI>
        </Target>
        <Source>
            <LocURI>./1/7/</LocURI>
            <LocName>New Folder</LocName>
        </Source>
    </Item>
</Add>
```

The client should return mapping information to the server indicating for the server how to relate the identifier of the server folder to that of the client folder, and the server should identify the folders using the client's folder identifiers. Thus, the Target element within the Item of an operational element sent by the server should always contain the client side folder path.

In case a new folder has been created on the server, and a message has been added to the folder, the server must send its folder operations (i.e. the Add command containing the folder information) in the first message of the server modifications package, and the Final flag must not be specified in the message. The client must be able to return folder identifier mapping information to the server in the subsequent message, so that the server can specify the client's folder identifier within the Target of the Add operation containing the actual message.

Renaming Folders

Since the display name of a folder is transferred within a LocName element, there is no special operation for renaming folders. Therefore, when the displayable name of a folder has been changed, a Replace command should be sent, and the LocName element should contain the new displayable name of the folder.

Moving Folders

Since the entire path of a folder is transferred within a LocURI element, there is no special operation for moving folders. Therefore, when a folder has been moved into another folder, a Replace command should be sent, and the new folder path should be included in the LocURI element. If a new folder has been created in the server, and an existing folder has been moved into the new folder, the server should first add the new folder to the client, and after receiving the mapping information for the folder identifier, the server should move the existing folder, i.e. it should then send the Replace command containing the new client side folder path.

Cooperation Between Application Elements, Sync Elements, and the Sync Engine

Figure 3:
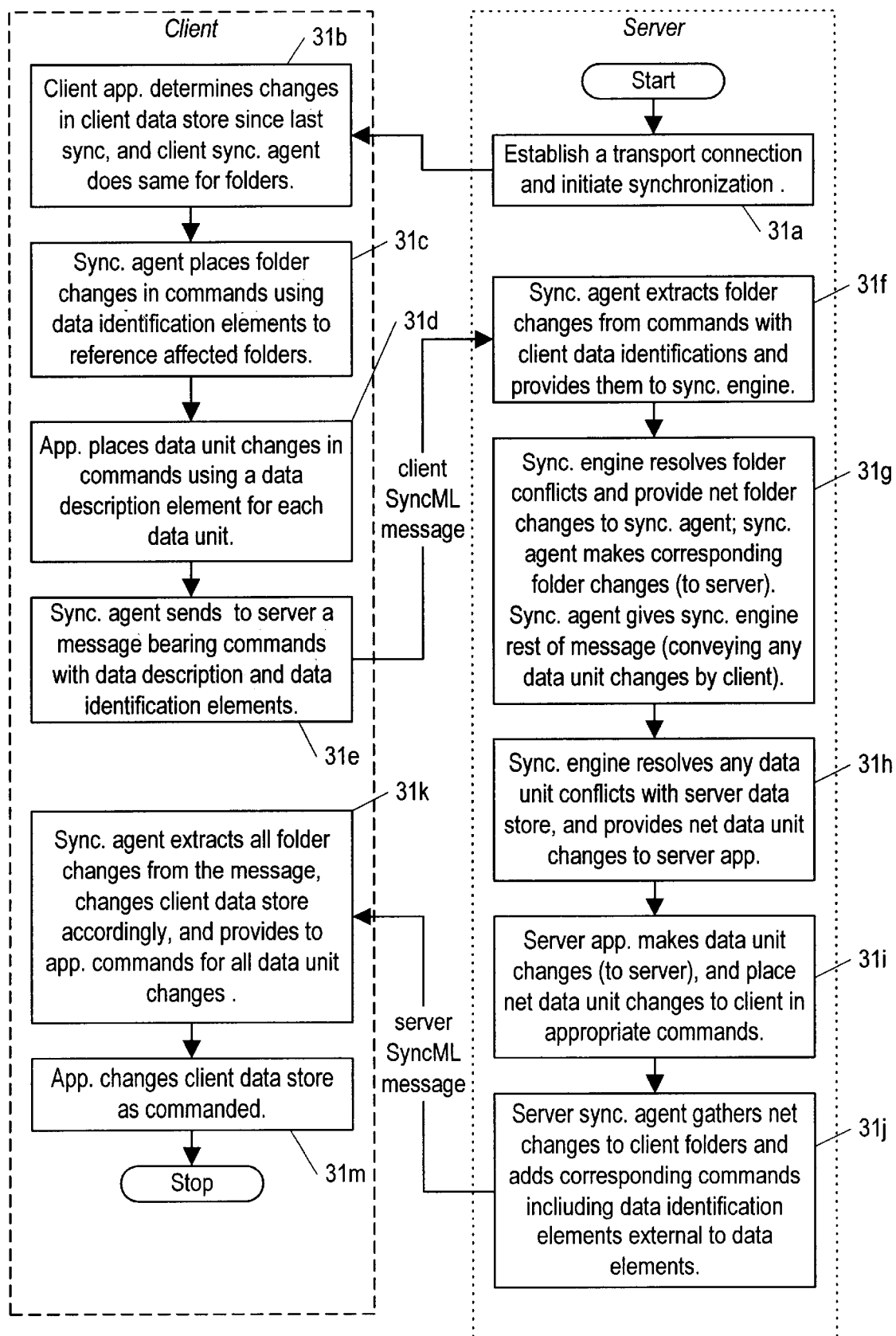
FIG. 3 is a flowchart illustrating one arrangement for cooperation between the components of a client and server during synchronization using messages constructed according to the invention.

One possible scheme by which the client and server applications 11a 11b and sync elements 11b 12b and server sync engine 12 cooperate to handle changes in data organization (directory structure) is indicated in FIG. 1 and also in FIG. 3, but such schemes are not the subject of the invention. What is important to understand is that the invention provides that the client and server sync elements 11b 12b need not parse a SyncML message down to the level of a data element in order to extract information having to do with changes in data organization, and that the client and server applications 11a 12a need not understand anything about the directory structure in order to access their respective data stores 11c 12c to be able to add, replace, or delete data.

Nevertheless, referring again to FIG. 1 and FIG. 3, in one arrangement for synchronizing the two data stores 11c 12c, in a first step 31a, the server sync agent 12b establishes a transport connection with the client sync agent 11b (the reciprocal action taken by the client sync agent being implied, but not shown in FIG. 3). In a next step 31b, the client application 11a (assuming only one application, although there can be more than one, all sharing the same data store) determines changes in the client data store 11c since the last synchronization and the client sync agent does the same for the folders in the data store 11c. Next, in a step 31c, the sync agent places folder changes in commands (protocol command elements) using data identification elements to reference affected folders, with the data identification elements external to any data elements, as explained above. Next, in a step 31d, the application places data unit changes in commands using a data description element (a data, item or meta element). Next, in a step 31e, the sync agent sends to the server 12 a message bearing commands with data description elements and data identification elements (external to any data elements).

Next, at the server 12, in a next step 31f, the sync agent 12b extracts the folder changes from any commands with client data identification elements external to any data elements, and based on what commands contained the client data identification elements, indicates to the sync engine 12f what changes were made to the client data store data structure since the last synchronization. In a next step 31g, the sync engine resolves folder conflicts and provide net folder changes to the server sync agent 12b; the server sync agent 12b makes corresponding folder changes to the server data store 12c; and the server sync agent then gives the (server) sync engine the rest of the message (conveying any data unit changes by client). In a next step 31h, the sync engine 12f resolves any data unit conflicts with the server data store that would be caused if the changes made to the client data store 11c were all made also to the server data store 12c, and provides the net data unit changes to the server application 12a. In a next step 31i, the server application makes the indicated data unit changes to the server data store 12c, and places the net data unit changes to the client data store 11c in appropriate commands. Then, in a next step 31j, the server sync agent collects the net changes to be made to the folders in the client data store 11c and adds corresponding commands including data identification elements indicating the affected folders, the data identification elements being placed external to any data elements within the message. (The message is then sent to the client.)

When the client 11 receives the server message, in a next step 31k, the client sync agent 11b extracts all folder changes by parsing the commands down to but not including any data elements included in the commands, changes the client data store 11c accordingly, and provides to the application 11a all commands for data unit changes. Finally, in a step 31m, the application 11a changes the client data store 11c according to the commands provided by the client sync agent 11b.

Scope of the Invention

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, for use by a first sync agent (11b 12b) operative in association with a first data store (11c 12c) and by a second sync agent (11b 12b) operative in association with a second data store (11c 12c), by which the first data store (11c 12c) is synchronized with the second data store (11c 12c), the data stores (11c 12c) each being used for storing data as data units in folders by a first and second respective application (11a 12a) distinct from the first and second sync agents (11b 12b), the folders in combination defining a data structure, the method comprising:

a step (31a) in which the first and second sync agents (11b 12b) establish a transport connection (14) for enabling communication between the first and second sync agents (11b 12b); and a step (31e 31j) in which the second sync agent (11b 12b) communicates via the transport connection (14) a message (21) to the first sync agent (11b 12b), the message (21) expressed using a markup language and having at least one data identification element (26 27) embedded in a non-data element field of a protocol command element;

wherein information about a change in the data structure of the first or second data store (11c 12c) includes identification of folders, in the information is transmitted in said message; and further wherein said information about a change in the data structure of the first or second data store (11c 12c) is placed in the at least one data identification element (26 27).

2. The method of claim 1, wherein the at least one data identification element (26 27) is either a target element (27) or a source element (26).

3. The method of claim 1, wherein the protocol command element (24) in combination with the data identification element (26 27) indicates the information about a change in the data structure of the first or second data store (11c 12c).

4. The method of claim 1, wherein the data identification element (26 27) contains a LocURI element (26a 27a) assigned by the second sync agent (11b 12b) and the information about a change in the data structure of the first or second data store (11c 12c) is provided in the LocURI element (26a 27a).

5. The method of claim 1, wherein a first device (11 12) hosts the first sync agent (11b 12b) as well as the first data store (11c 12c) and the first application (11a 12a) and a second device (11 12) hosts the second sync agent (11b 12b) and also the second data store (11c 12c) and the second application (11a 12a).

6. The method of claim 5, wherein the first device (11 12) functions as a client in a client/server protocol and the second device (11 12) as a server in the client/server protocol, and the message (21) is provided by the client to the server.

7. The method of claim 5, wherein the first device (11 12) functions as a server in a client/server protocol and the second device (11 12) as a client in the client/server protocol, and the message (21) is provided by the server to the client, and the step of communicating the message (21) is responsive to a client message (21) and includes resolving any conflicts posed by the client message (21) in respect to the data store (11c 12c) hosted by the server.

8. A device (11 12) operative according to the method of claim 5 in respect to the operation of the first device (11 12) and also in respect to the operation of the second device (11 12).

9. A device as in claim 8, wherein the device (11 12) is a wireless communication terminal.

10. A device as in claim 8, wherein the device (11 12) is a wireline communication terminal.

11. A device (12) as in claim 8 wherein the device (12) functions as a server in a client server model and includes a sync engine (12f) for resolving conflicts posed by the message (21).

12. A system, comprising a first device (12) as in claim 8 and wherein the first device (12) functions as a server in a client server model and includes a sync engine (12f) for resolving conflicts posed by the message (21), and also comprising a second device (11) as in claim 8 and wherein the second device (11) functions as a client in the client server model.

13. A computer program for providing instructions to a telecommunications device (11 12) so that the telecommunications device (11 12) is operative according to the method of claim 5 in respect to the first device (11 12) and also in respect to the second device (11 12).

14. The method of claim 1, wherein the first application (11a 12a) is responsive to any data element (28 29) included in the message (21) and the first sync agent (11b 12b) is responsive to the data identification element (26 27) and makes changes to the data structure of the first data store (11c 12c) based on the information conveyed by the data identification element (26 27) before the first application (11a 12a) makes any changes to the data units of the data store (11c 12c) based on information conveyed by any data elements included in the message (21).

15. The method of claim 1, wherein the second sync agent (11b 12b) provides in the data identification element (26 27)

the information about a change in the data structure of the first or second data store (11c 12c) and the second application (11a 12a) provides in a data element (28 29) information about a change in data units in the first or second data store (11c 12c).

16. The method of claim 1, wherein the first sync agent (11b 12b), in response to the message (21), extracts the information about a change in the data structure from the data identification element (26 27) and provides the information to either a sync engine (12f) or to an application entity (11a 12a).

17. A computer program for providing instructions to a sync agent (11b 12b) so that the sync agent (11b 12b) is operative according to the method of claim 1 in respect to the first sync agent (11b 12b) and also in respect to the second sync agent (11b 12b).

* * * * *

UNITED STATES PATENT AND TRADEMARK OFFICE
CERTIFICATE OF CORRECTION

PATENT NO. : 6,721,871 B2
DATED : April 2, 2002
INVENTOR(S) : Jussi Piispanen and Mikko Sahinoja It is certified that error appears in the above-identified patent and that said Letters Patent is hereby corrected as shown below:

Column 21,
Line 62, delete "in" and substitute -- and --.

Signed and Sealed this

Second Day of August, 2005

JON W. DUDAS
*Director of the United States Patent and Trademark Office*